US011928923B2

(12) United States Patent
Idris et al.

(10) Patent No.: US 11,928,923 B2
(45) Date of Patent: Mar. 12, 2024

(54) IDENTIFYING CASINO GROUP VISITORS

(71) Applicant: IGT, Las Vegas, NV (US)

(72) Inventors: Fayez Idris, New Brunswick (CA); David Froy, New Brunswick (CA); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 4 days.

(21) Appl. No.: 17/504,887

(22) Filed: Oct. 19, 2021

(65) Prior Publication Data

US 2023/0117466 A1 Apr. 20, 2023

(51) Int. Cl.
*G07F 17/32* (2006.01)

(52) U.S. Cl.
CPC ...... *G07F 17/3239* (2013.01); *G07F 17/3241* (2013.01)

(58) Field of Classification Search
CPC ......................... G07F 17/3239; G07F 17/3241
See application file for complete search history.

(56) References Cited

U.S. PATENT DOCUMENTS

| | | | |
|---|---|---|---|
| 6,517,435 | B2 | 2/2003 | Soltys et al. |
| 6,712,696 | B2 | 3/2004 | Soltys et al. |
| 8,087,996 | B2 | 1/2012 | Walker et al. |
| 8,147,334 | B2 | 4/2012 | Gatto et al. |
| 8,235,784 | B2 | 8/2012 | Christensen |
| 8,764,566 | B2 | 7/2014 | Miltenberger et al. |
| 8,851,981 | B2 | 10/2014 | Ramsey et al. |
| 8,888,587 | B2 | 11/2014 | Burke et al. |
| 9,384,629 | B2 | 7/2016 | Chun et al. |
| 2003/0045358 | A1 | 3/2003 | Leen et al. |
| 2007/0123346 | A1 | 5/2007 | Perez et al. |
| 2008/0214308 | A1 | 9/2008 | Lyons et al. |
| 2008/0318655 | A1* | 12/2008 | Davies ................ G07F 17/3274 463/16 |
| 2009/0275411 | A1 | 11/2009 | Kisenwether et al. |
| 2010/0075757 | A1 | 3/2010 | Hein |
| 2013/0012293 | A1 | 1/2013 | Walker et al. |
| 2014/0148230 | A1* | 5/2014 | Guase ................. G07F 17/3274 463/20 |
| 2015/0080108 | A1 | 3/2015 | Decasa, Jr. et al. |
| 2015/0099576 | A1 | 4/2015 | Anderson et al. |

(Continued)

FOREIGN PATENT DOCUMENTS

| | | |
|---|---|---|
| EP | 2958069 | 12/2015 |
| WO | WO 2005/034053 | 4/2005 |

*Primary Examiner* — Kevin Y Kim
(74) *Attorney, Agent, or Firm* — Sheridan Ross P.C.

(57) ABSTRACT

In certain embodiments, the present disclosure relates to a method for monitoring individuals within a gaming venue. The method can comprise receiving, by a surveillance system of the gaming venue, input from a plurality of input devices at different locations within the gaming venue and identifying, by the surveillance system of the gaming venue, each of a plurality of individuals within the gaming venue based on the received input from the plurality of input devices. Two related individuals of the plurality of individuals can be identified by the surveillance system of the gaming venue based on a model defining factors for identifying relationships between individuals and an action directed to the identified two related individuals can be initiated by the surveillance system of the gaming venue.

20 Claims, 5 Drawing Sheets

(56) References Cited

U.S. PATENT DOCUMENTS

| | | | | |
|---|---|---|---|---|
| 2017/0236370 | A1* | 8/2017 | Wang | A63F 13/33 463/25 |
| 2021/0104114 | A1* | 4/2021 | Eager | G07F 17/3223 |

* cited by examiner

IDENTIFYING CASINO GROUP VISITORS

BACKGROUND

The present disclosure is generally directed to monitoring individuals within a gaming venue and, in particular, toward identifying groups of related individuals within the gaming venue.

Visiting a gaming venue such as a casino is often done by groups of friends or relatives. This makes the visit a fun, social activity and often enhances the experience. For the gaming venue, this is an important aspect of the experience because it can help to encourage visits and even repeat visits by the members of the group which in turn increases revenue for the gaming venue. However, the gaming venue has little insight into when such visits occur, who are members of such groups, and relationships between the members if these groups. Such insight would be beneficial to the gaming venue to encourage future visits by, for example, offering certain benefits to the members of such groups. Hence there is a need in the art for methods and system for monitoring individuals within the gaming venue and identifying groups of potentially related individuals.

BRIEF SUMMARY

In certain embodiments, the present disclosure relates to a method for monitoring individuals within a gaming venue. The method can comprise receiving, by a surveillance system of the gaming venue, input from a plurality of input devices at different locations within the gaming venue and identifying, by the surveillance system of the gaming venue, each of a plurality of individuals within the gaming venue based on the received input from the plurality of input devices. Two related individuals of the plurality of individuals can be identified by the surveillance system of the gaming venue based on a model defining factors for identifying relationships between individuals and an action directed to the identified two related individuals can be initiated by the surveillance system of the gaming venue.

For example, identifying an individual of the plurality of individuals within the gaming venue can be based on the individual accessing a gaming system of the gaming venue. Additionally, or alternatively, identifying an individual of the plurality of individuals within the gaming venue can be based on a unique identifier for the individual received from one of the plurality of input devices.

In some cases, identifying the two related individuals of the plurality of individuals can be further based on a group identifier received from one of the plurality of input devices. The model can be trained by the surveillance system of the gaming venue based on identifying the two related individuals of the plurality of individuals within the gaming venue.

Additionally, or alternatively, the surveillance system of the gaming venue can track each of the plurality of individuals within the gaming venue based on the received input from the plurality of input devices. In such cases, identifying the two related individuals can be further based on the tracking of each of the plurality of individuals within the gaming venue. Tracking each of the plurality of individuals within the gaming venue can comprise tracking movements and gestures of each individual and wherein identifying the two related individuals of the plurality of individuals in the gaming venue can be further based on the movements and gestures of each individual of the plurality of individuals.

According to another embodiment, a system can comprise a plurality of input devices at different locations within a gaming venue and a processor communicatively coupled with each of the plurality of input devices. A memory can be coupled with and readable by the processor and can store therein a set of instructions which, when executed by the processor, causes the processor to receive input from the plurality of input devices, identify each of a plurality of individuals within the gaming venue based on the received input from the plurality of input devices, and identify two related individuals of the plurality of individuals based on a model defining factors for identifying relationships between individuals. An action directed to the identified two related individuals can then be initiated.

In some cases, the instructions can further cause the processor to track each of the plurality of individuals within the gaming venue based on the received input from the plurality of input devices and identifying the two related individuals can be further based on the tracking each of the plurality of individuals within the gaming venue. For example, an input device of the plurality of input devices can comprise a camera. In such cases, tracking each of the plurality of individuals within the gaming venue comprises tracking movement and actions by each of the plurality of individuals based on the received input from the camera. Additionally, or alternatively, an input device of the plurality of input devices can comprise an input device of a gaming system of the gaming venue. In such cases, tracking each of the plurality of individuals within the gaming venue can comprise tracking a location and actions by each of the plurality of individuals within the gaming venue based on the received input from the input device of the gaming system. In any such case, tracking each of the plurality of individuals within the gaming venue can comprise tracking movement and actions by each of the plurality of individuals and identifying the two related individuals of the plurality of individuals can be further based on correlating the movement and actions by the two related individuals.

According to yet another embodiment, a non-transitory, computer-readable medium can comprise a set of instructions stored therein which, when executed by a processor, causes the processor to receive input from the plurality of input devices, identify each of a plurality of individuals within the gaming venue based on the received input from the plurality of input devices, identify two related individuals of the plurality of individuals based on a model defining factors for identifying relationships between individuals, and initiate an action directed to the identified two related individuals. In some cases, the instructions can further cause the processor to track each of the plurality of individuals within the gaming venue based on the received input from the plurality of input devices and identifying the two related individuals can be further based on the tracking each of the plurality of individuals within the gaming venue.

Initiating an action directed to the identified two related individuals can comprise providing an electronic message to a mobile device of each of the identified two related individuals and receiving from the mobile device of each of the identified two related individuals a response confirming or denying a relationship between the identified two related individuals. In such cases, the instructions can further cause the processor to train the model based on the received responses from the mobile device of each of the identified two related individuals confirming or denying the relationship between the identified two related individuals. Additionally, or alternatively, initiating an action directed to the identified two related individuals can comprise enabling a feature of a gaming system of the gaming venue for the two related individuals. Initiating an action directed to the identified two related individuals can additionally, or alternatively, comprise providing to a mobile device of each of the two related individuals an electronic message indicating availability of a benefit provided by the gaming venue.

Additional features and advantages are described herein and will be apparent from the following Description and the figures.

DETAILED DESCRIPTION

Embodiments of the present disclosure will be described in connection with a monitoring individuals within a gaming venue. More specifically, embodiments described herein are directed to leveraging a surveillance system of the gaming venue and inputs to that system such as cameras and other input devices at various locations around the gaming venue to identify groups of related individuals within the gaming venue. Once identified, certain actions directed to the group can be initiated by the surveillance system. For example, certain additional functions or features of gaming systems of the gaming venue may be made available to the members of the group and messages can be sent to the mobile devices of the members of the group to indicate availability of these additional functions or features. Additionally, or alternatively, such messages can indicate other available services of the gaming venue, provide certain incentives or offers, etc. In this way a social aspect of visiting the gaming venue can be enhanced thereby encouraging group visits and repeat visits to the gaming venue which in turn can increase revenue for the gaming venue.

Figure 1:
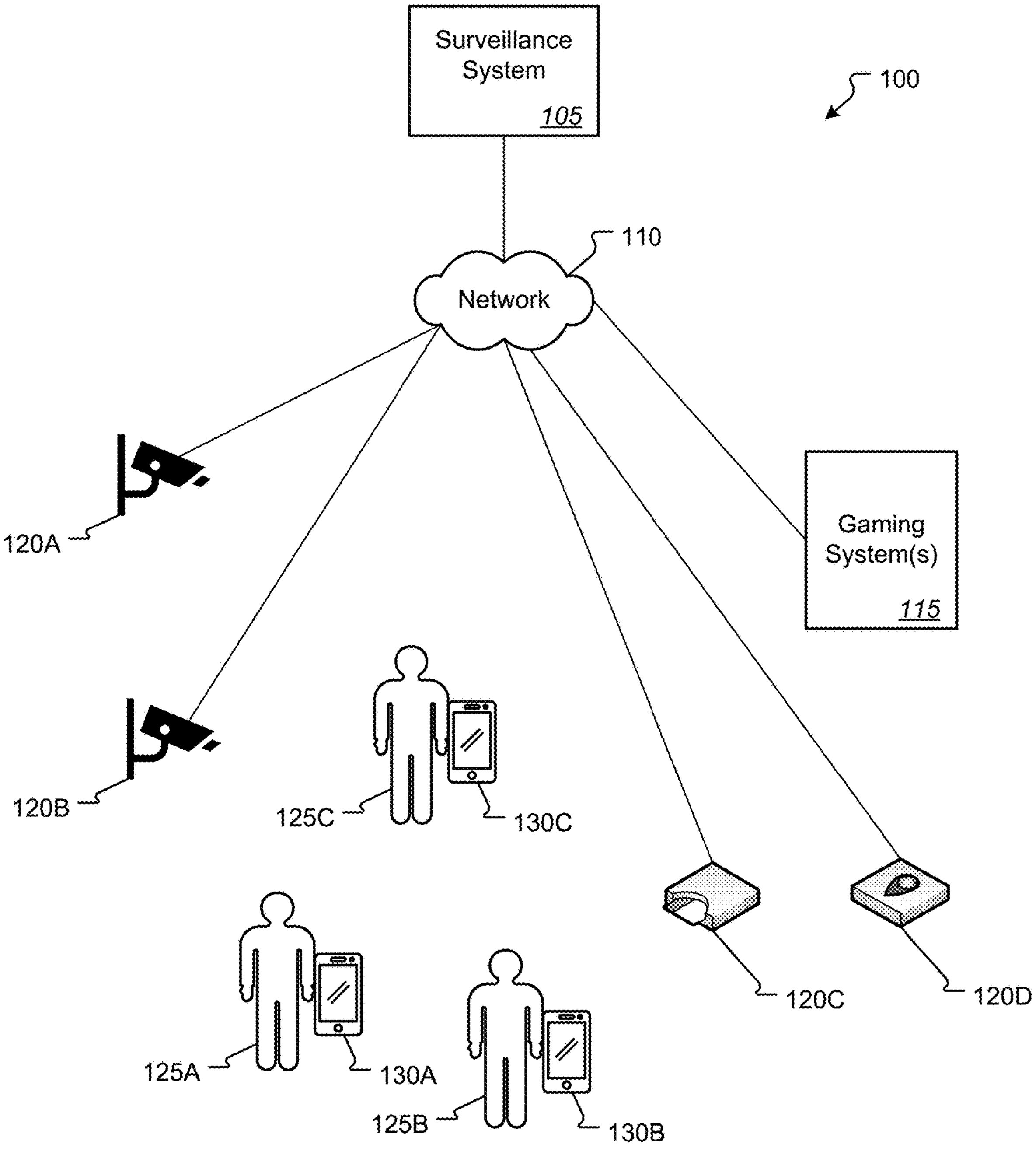
FIG. 1 is a diagram illustrating a gaming venue environment in which embodiments of the present disclosure may be implemented.

FIG. 1 is a diagram illustrating a gaming venue environment in which embodiments of the present disclosure may be implemented. As illustrated in this example, the environment 100 can include a gaming venue surveillance system 105 such as commonly used in casinos to monitor for theft, cheating, money laundering activities, and other activities raising legal and safety concerns. The surveillance system 105 can be commutatively coupled with a network 110 such as a wired and/or wireless Local Area Network (LAN) within the gaming venue. Also coupled with the network 110 can be one or more gaming systems 115 of the gaming venue and any number of input devices 120A-D including, but not limited to, cameras 120A and 120B, card readers 120C, biometric scanners 120D, other scanners or readers (not shown here), BlueTooth and/or other devices (not shown here) for detected cell phones and/or other mobile devices, etc.

Generally speaking, embodiments of the present disclosure are directed to monitoring a number of individually 125A-C within the gaming venue. Based on this monitoring, the surveillance system 105 can identify a group of related individuals and provide various group-based features to each member of the group. The group-based features may be, but are in no way limited to, enabling certain gaming features on one or more of the gaming systems 115 for any member of the group, providing a group coupon to each group member to receive bonuses or discounts on certain gaming content, etc. The surveillance system 105 can also track card-in activity or connectivity of a mobile device 130A-130C of the individuals 125A-125C at gaming systems 115 to see if certain visitors tend to frequent a casino as a group. The surveillance system 105 can then provide the group with the group-based features. The surveillance system 105 can also then incentivize the group visitors to return by offering future offers to members of the group.

The surveillance system 105 used in a gaming venue can capture video streams from the cameras 120A and 120B at different locations in the gaming venue. The surveillance system 105 can use face recognition to tag the different people appearing in a video stream. Once individuals 125A-125C have been identified, individuals 125A and 125B appearing together in different streams, e.g., at the same time and same location, might be considered to be related somehow, e.g., friends or relatives, etc. The identification of related individuals 125A and 125B by the surveillance system 105 can take into consideration other contextual information such as individuals posing to take a selfie, individuals dinning together, etc.

Once related individuals 125A and 125B have been identified, the surveillance system 105 could extend offers to them, e.g., through messages sent to their mobile devices 130A and 130B. In another example, if the surveillance system 105 identifies related individuals 125A and 125B on different gaming systems 115, such a message can invite them to play multiplayer games. In another embodiment, an enabled feature could be to allow groups of individuals 125A and 125B to participate in a tournament as a team, where the individuals, i.e., teammate in the group, could work together for a combined pot of points and share in the winnings based upon the number of group members. In some cases, multiple groups could compete against each other. If groups have a different number of members, the group with the lower number of members may have a multiplier applied to scale up their credits won to make up for the missing group members.

Over time and during multiple visits, each individual 125A-C could be tracked with different people to understand relationships between individuals. In this way, the surveillance system 105 can build a web or graph of relationships between individuals. Once established, if a known individual 125A enters the gaming venue, related individuals 125B could be messaged by the surveillance system 105 and be prompted to let them know that their friend, relative, acquaintance, etc. is at the gaming venue and suggest they come and visit.

According to one embodiment, the surveillance system 105 can be adapted to pre-define groups based on an indication of members group provided by one or more members of the group. Such a group can then be identified by the surveillance system 105 when they arrive or check in at the gaming venue based on that group definition. Stated another way, the surveillance system 105 can receive a group definition from one or more members of the proposed group. This can be accomplished, for example, by the member(s) providing a unique identifier of each proposed member, e.g., a name, alias, identification number, etc. through a website, mobile application, kiosk in the gaming venue, etc. A unique group identifier, e.g., a name, number, QR code, etc. can be generated by the surveillance system 105 for the defined group and the group identifier can be provided by the surveillance system 105 to each member of the group. For example, the unique group identifier can be sent by the surveillance system 105 to a mobile device 130A and 130B for each individual 125A and 125B who is a member of the group through a Short Message Service (SMS) message or mobile application executing on the mobile device of each member.

When the members of the group arrive at the gaming venue, each member can present the group identifier to check in or initiate the group activity. For example, each member can scan a provided QR code or enter a provided group identifier through a gaming system 115, kiosk, scanner, etc. within the gaming venue. This group identifier can then be received by the surveillance system 105 of the gaming venue, along with an identifier for that member, and the member can be assigned or checked into the group.

According to another embodiment, related individuals 125A and 125B can be identified automatically or dynamically without any pre-definition of a group by the members of that group or otherwise. In these cases, the by the surveillance system 105 can receive input from a plurality of input devices 120A-D at different locations within the gaming venue and identify each of the plurality of individuals 125A-C within the gaming venue based on the received input from the plurality of input devices 120A-D. The initial identification of the individuals 125A-C can be performed in a variety of manners as described above and can comprise, for example, tagging each individual 125A-C with a unique but anonymous identifier for the sake of monitoring. In other cases, one or more of the individuals 125A-C may be known to the surveillance system 105 and can be identified by an assigned username, number, alias, etc.

Two related individuals 125A and 125B of the plurality of individuals can be identified by the surveillance system 105 of the gaming venue. For example, the surveillance system 105 of the gaming venue can track each of the plurality of individuals 125A-C within the gaming venue based on the received input from the plurality of input devices 120A-D. For example, and as described above, an input device of the plurality of input devices 120A-120D can comprise one or more cameras 120A and 120B. In such cases, tracking each of the plurality of individuals 125A-C within the gaming venue can comprise tracking movement and actions by each of the plurality of individuals 125A-C based on the received input from the cameras 120A and 120B. Additionally, or alternatively, an input device of the plurality of input devices can comprise an input device of a gaming system 115 of the gaming venue. In such cases, tracking each of the plurality of individuals within the gaming venue can comprise tracking a location and actions by each of the plurality of individuals 125A-C within the gaming venue based on the received input from the input device of the gaming system, e.g., carding into the gaming system 115. In any such case, tracking each of the plurality of individuals 125A-125C within the gaming venue can comprise tracking movement and actions by each of the plurality of individuals 125A-125C and identifying 315 the two related individuals 125A and 125B of the plurality of individuals can be further based on correlating the movement and actions by the two related individuals 125A and 125B.

More specifically, tracking of each individual 125A-C can begin with the surveillance system 105 tagging each individual 125A-C when entering the gaming venue or otherwise performing some action such as carding into a gaming system 115. Tagging each individual 125A-125C can comprise assigning a unique but anonymous identifier to each individual for the sake of monitoring. In other cases, one or more of the individuals 125A-C may be known to the surveillance system 105 and can be identified by an assigned username, number, alias, etc.

Once tagged, the location of each individual within the gaming venue can be mapped by the surveillance system 105 on a virtual map of the gaming venue and that location, as well as actions performed by each individual can be tracked as the individuals move about the gaming venue. The actions tracked can comprise, for example, gestures and/or motions, a direction of gaze, expressions or motions of the face such as movement of the mouth indicative of speaking, etc.

As each individual is tracked, their movements and/or actions may indicate some correlation. For example, two individuals 125A and 125B may enter the gaming venue at or near the same time. This can indicate some initial correlation. Additionally, or alternatively, these two individuals 125A and 125B may stand, sit, and/or walk near each other for some period of time indicating that they may be related. Based on definitions in the model, these movements can be scored. For example, the model may define that sitting or standing together for a certain period of time indicates a certain confidence level that these two individuals 125A and 125B are somehow related. Similarly, the model may indicate that walking together for a certain amount of time may indicate a confidence level that these two individuals 125A and 125B are related. This confidence level can increase or decrease as defined by the model as the individuals spend more or less time in proximity to each other. The location within the gaming venue and the proximity may also affect the confidence level based on the definitions in the model. For example, proximity within a predefined distance when in a restaurant or bar of the gaming venue or at a gaming table of the gaming venue may indicate a relatively high confidence level that these two individuals 125A and 125B are related.

In addition to location, actions may be tracked. For example, the surveillance system 105 can track card in activity to gaming systems 115 within the gaming venue. The model may indicate that carding into the same gaming system 115 or nearby gaming systems may indicate a predefined confidence level that these two individuals 125A and 125B are related. Other tracked activities, e.g., tracked through cameras 120A and 120B of the gaming venue, can include, but are not limited to, gestures and/or motions, a direction of gaze, expressions or motions of the face such as movement of the mouth indicative of speaking, etc. The model can define certain confidence levels that the two individuals 125A and 125B are related based on these actions. For example, shaking hands, hugging, speaking to one another, waving or gesturing in the direction of each other, looking at each other, etc. can be actions for which the model defines different confidence levels that these two individuals 125A and 125B are related.

As the individuals 125A-125C are tracked while they move about the gaming venue and their movement and actions are scored 520, the confidence that two individuals 125A and 125B are related will increase or decrease. Individuals 125A-125C can then be defined or identified as related or unrelated based on this confidence score and predefined thresholds in the model. For example, once the confidence score drops below a certain lower threshold defined in the model, two individuals 125B and 125C can be marked or tagged as unrelated by the surveillance system 105. Similarly, once the confidence score exceeds a certain upper threshold defined in the model, two individuals 125A and 125B can be marked or tagged as related by the surveillance system 105.

Once the related individuals 125A and 125B have been identified, an action directed to the identified two related individuals 125A and 125B can be initiated by the surveillance system 105 of the gaming venue. For example, initiating an action directed to the identified two related individuals 125A and 125B can comprise providing an electronic message to a mobile device 130A and 130B of each of the identified two related individuals 125A and 125B and receiving from the mobile device 130A and 130B of each of the identified two related individuals 125A and 125B a response confirming or denying a relationship between the identified two related individuals 125A and 125B. Additionally, or alternatively, initiating an action directed to the identified two related individuals 125A-125B can comprise enabling a feature of a gaming system 115 of the gaming venue for the two related individuals 125A and 125B. In yet another example, initiating an action directed to the identified two related individuals 125A and 125B can additionally, or alternatively, comprise providing to a mobile device 130A and 130B of each of the two related individuals an electronic message indicating availability of a benefit provided by the gaming venue, e.g., a discount or special offer, availability of certain services to groups, etc.

As related individuals 125A and 125B are identified, the model can be trained by the surveillance system 105 of the gaming venue. For example, the model can be trained based on an initial, manual definition of a group and tracking of the individuals in that group within the gaming venue. Additionally, or alternatively, the model can be trained based on tracking of individuals within the gaming venue and the received responses from the mobile device 130A and 130B of each of the identified two related individuals 125A and 125B confirming or denying the relationship between the identified two related individuals.

Figure 2:
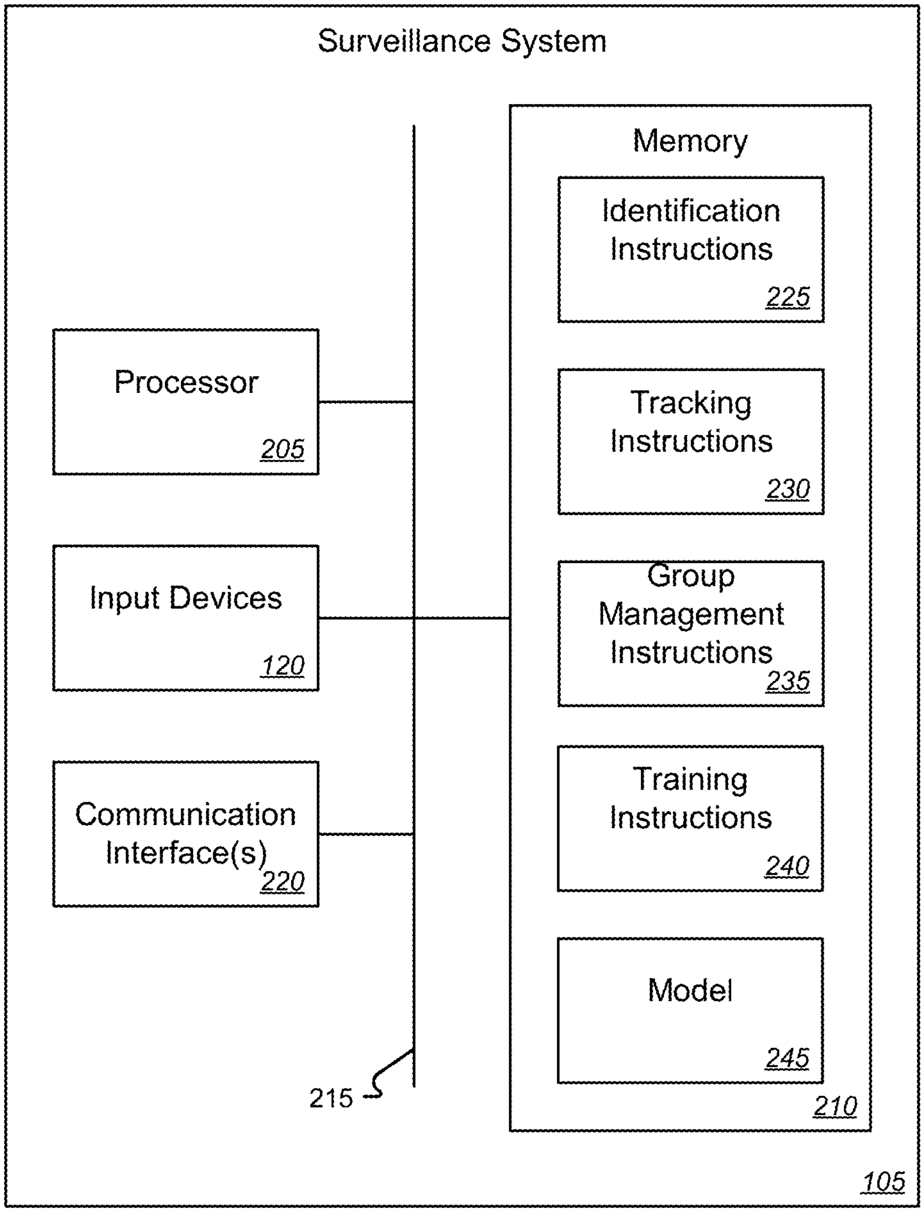
FIG. 2 is a block diagram illustrating additional details and components of a surveillance system according to one embodiment of the present disclosure.

FIG. 2 is a block diagram illustrating additional details and components of a surveillance system according to one embodiment of the present disclosure. As illustrated in this example, the surveillance system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the surveillance system 105 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with a number of input devices 120 and one or more communication interfaces 220 via the communications bus 215. The input devices 120, as described above, can comprise one or more cameras, card readers, biometric scanners, and/or other devices within the gaming venue. The communication interfaces 220 can comprise, for example, Ethernet, Bluetooth, WiFi, or other type of wired or wireless communications interfaces.

The memory 210 can store therein sets of instructions which, when executed by the processor 205, cause the processor 205 to operate the surveillance system 105 as described herein. More specifically, the memory 210 can store therein a set of identification instructions 225 which, when executed by the processor 205, can cause the processor 205 to receive by input from the input devices 120 and identify each of a plurality of individuals 125A-C within the gaming venue based on the received input from the input devices 120. The initial identification of the individuals 125A-C can be performed in a variety of manners as described above and can comprise, for example, tagging each individual 125A-C with a unique but anonymous identifier for the sake of monitoring. In other cases, one or more of the individuals 125A-C may be known to the surveillance system 105 and can be identified by an assigned username, number, alias, etc. The identification instructions 225 can also cause the processor 205 to identify two or more related individuals 125A and 125B. This identification can be performed manually or automatically based on a model 245 defining factors for identifying relationships between individuals. For example, identifying an individual of the plurality of individuals 125A-C within the gaming venue can be based on the individual accessing a gaming system 115 of the gaming venue, e.g., carding into the gaming system 115. Additionally, or alternatively, identifying an individual of the plurality of individuals within the gaming venue can be based on a unique identifier for the individual received from one of the plurality of input devices, e.g., through a card reader 120C. In some cases, identifying the two related individuals 125A and 125B of the plurality of individuals 125A-C can be further based on a group identifier received from one of the plurality of input devices 120A-D. For example, the individuals 125A and 125B may scan a group code downloaded onto their mobile devices 130A and 130B at a gaming system 115, kiosk, scanner, etc. within the gaming venue.

The memory 210 can also have stored therein a set of tracking instructions 230. The tracking instructions 230, when executed by the processor 205, can cause the processor 205 to track the location and actions of each of the plurality of individuals 125A-C within the gaming venue based on the received input from the plurality of input devices 120A-D. For example, and as described above, an input device of the plurality of input devices 120A-120D can comprise one or more cameras 120A and 120B. In such cases, tracking each of the plurality of individuals 125A-C within the gaming venue can comprise tracking movement and actions by each of the plurality of individuals 125A-C based on the received input from the cameras 120A and 120B. Additionally, or alternatively, an input device of the plurality of input devices can comprise an input device of a gaming system 115 of the gaming venue. In such cases, tracking each of the plurality of individuals within the gaming venue can comprise tracking a location and actions by each of the plurality of individuals 125A-C within the gaming venue based on the received input from the input device of the gaming system, e.g., carding into the gaming system 115. In any such case, tracking each of the plurality of individuals 125A-125C within the gaming venue can comprise tracking movement and actions by each of the plurality of individuals 125A-125C and identifying 315 the two related individuals 125A and 125B of the plurality of individuals can be further based on correlating the movement and actions by the two related individuals 125A and 125B.

The memory 210 can also have stored therein a set of group management instructions 235 which, when executed by the processor 205, can cause the processor 205 to perform various actions related to identified groups of related individuals 125A and 125B. For example, an action directed to the identified two related individuals 125A and 125B can be initiated to provide an electronic message to a mobile device 130A and 130B of each of the identified two related individuals 125A and 125B and receive from the mobile device 130A and 130B of each of the identified two related individuals 125A and 125B a response confirming or denying a relationship between the identified two related individuals 125A and 125B. Additionally, or alternatively, an action directed to the identified two related individuals 125A-125B can enable a feature of a gaming system 115 of the gaming venue for the two related individuals 125A and 125B. In yet another example, an action directed to the identified two related individuals 125A and 125B can additionally, or alternatively, comprise providing to a mobile device 130A and 130B of each of the two related individuals an electronic message indicating availability of a benefit provided by the gaming venue, e.g., a discount or special offer, availability of certain services to groups, etc.

The memory 210 can also have stored therein a set of training instructions 240. The training instructions 240, when executed by the processor 205, can cause the processor 205 to train the model 245 on an initial and/or ongoing basis. For example, the model can be trained based on an initial, manual definition of a group and tracking of the individuals in that group within the gaming venue. Additionally, or alternatively, the model can be trained based on tracking of individuals within the gaming venue and the received responses from the mobile device 130A and 130B of each of the identified two related individuals 125A and 125B confirming or denying the relationship between the identified two related individuals.

Figure 3:
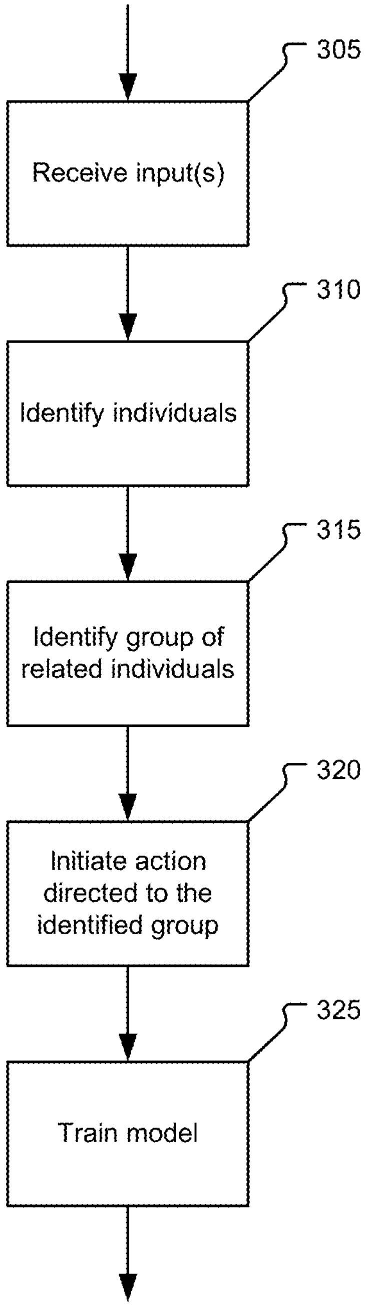
FIG. 3 is a flowchart illustrating an exemplary process for monitoring individuals within a gaming venue according to one embodiment of the present disclosure.

FIG. 3 is a flowchart illustrating an exemplary process for monitoring individuals within a gaming venue according to one embodiment of the present disclosure. As illustrated in this example, the process can begin with receiving 305, by a surveillance system 105 of a gaming venue such as described above, input from a plurality of input devices 120A-D at different locations within the gaming venue and identifying 310, by the surveillance system 105 of the gaming venue, each of a plurality of individuals 125A-C within the gaming venue based on the received input from the plurality of input devices 120A-D. The initial identification of the individuals 125A-C can be performed in a variety of manners as described above and can comprise, for example, tagging each individual 125A-C with a unique but anonymous identifier for the sake of monitoring. In other cases, one or more of the individuals 125A-C may be known to the surveillance system 105 and can be identified by an assigned username, number, alias, etc.

Two related individuals 125A and 125B of the plurality of individuals can be identified 315 by the surveillance system 105 of the gaming venue. This identification can be performed manually or automatically based on a model defining factors for identifying relationships between individuals. For example, identifying an individual of the plurality of individuals 125A-C within the gaming venue can be based on the individual accessing a gaming system 115 of the gaming venue, e.g., carding into the gaming system 115. Additionally, or alternatively, identifying an individual of the plurality of individuals within the gaming venue can be based on a unique identifier for the individual received from one of the plurality of input devices, e.g., through a card reader 120C. In some cases, identifying the two related individuals 125A and 125B of the plurality of individuals 125A-C can be further based on a group identifier received from one of the plurality of input devices 120A-D. For example, the individuals 125A and 125B may scan a group code downloaded onto their mobile devices 130A and 130B at a gaming system 115, kiosk, scanner, etc. within the gaming venue.

Additionally, or alternatively, the surveillance system 105 of the gaming venue can track each of the plurality of individuals 125A-C within the gaming venue based on the received input from the plurality of input devices 120A-D. For example, and as described above, an input device of the plurality of input devices 120A-120D can comprise one or more cameras 120A and 120B. In such cases, tracking each of the plurality of individuals 125A-C within the gaming venue can comprise tracking movement and actions by each of the plurality of individuals 125A-C based on the received input from the cameras 120A and 120B. Additionally, or alternatively, an input device of the plurality of input devices can comprise an input device of a gaming system 115 of the gaming venue. In such cases, tracking each of the plurality of individuals within the gaming venue can comprise tracking a location and actions by each of the plurality of individuals 125A-C within the gaming venue based on the received input from the input device of the gaming system, e.g., carding into the gaming system 115. In any such case, tracking each of the plurality of individuals 125A-125C within the gaming venue can comprise tracking movement and actions by each of the plurality of individuals 125A-125C and identifying 315 the two related individuals 125A and 125B of the plurality of individuals can be further based on correlating the movement and actions by the two related individuals 125A and 125B.

Once the related individuals 125A and 125B have been identified 315, an action directed to the identified two related individuals 125A and 125B can be initiated 320 by the surveillance system 105 of the gaming venue. For example, initiating 320 an action directed to the identified two related individuals 125A and 125B can comprise providing an electronic message to a mobile device 130A and 130B of each of the identified two related individuals 125A and 125B and receiving from the mobile device 130A and 130B of each of the identified two related individuals 125A and 125B a response confirming or denying a relationship between the identified two related individuals 125A and 125B. Additionally, or alternatively, initiating 320 an action directed to the identified two related individuals 125A-125B can comprise enabling a feature of a gaming system 115 of the gaming venue for the two related individuals 125A and 125B. In yet another example, initiating 320 an action directed to the identified two related individuals 125A and 125B can additionally, or alternatively, comprise providing to a mobile device 130A and 130B of each of the two related individuals an electronic message indicating availability of a benefit provided by the gaming venue, e.g., a discount or special offer, availability of certain services to groups, etc.

As related individuals 125A and 125B are manually and/or automatically identified 315, the model can be trained 325 by the surveillance system 105 of the gaming venue. For example, the model can be trained based on an initial, manual definition of a group and tracking of the individuals in that group within the gaming venue. Additionally, or alternatively, the model can be trained based on tracking of individuals within the gaming venue and the received responses from the mobile device 130A and 130B of each of the identified two related individuals 125A and 125B confirming or denying the relationship between the identified two related individuals.

Figure 4:
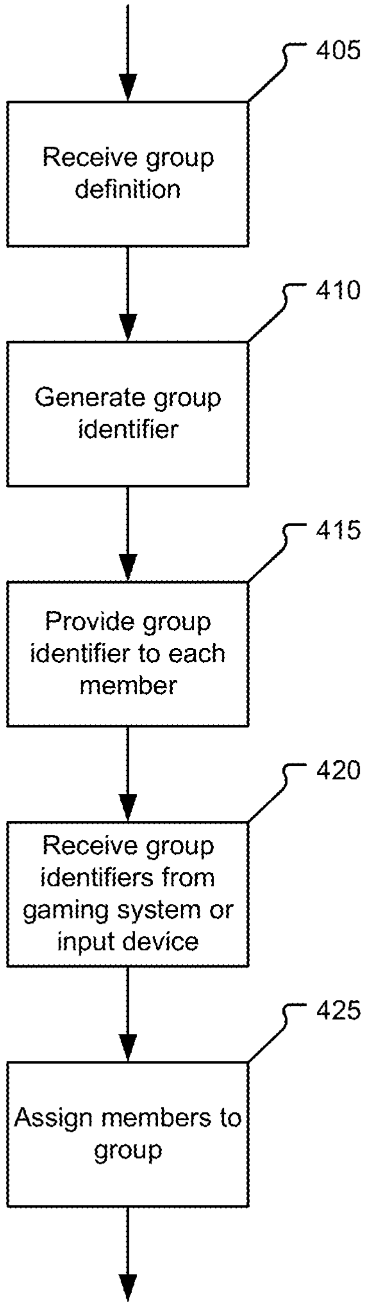
FIG. 4 is a flowchart illustrating an exemplary process for identifying related individuals within a gaming venue according to one embodiment of the present disclosure.

FIG. 4 is a flowchart illustrating an exemplary process for identifying related individuals within a gaming venue according to one embodiment of the present disclosure. More specifically, this example illustrates a process for defining groups based on a definition of the group provided by one or more members of the group and identifying the group when they arrive or check in at the gaming venue based on that definition. As illustrated in this example, the process can begin with receiving 405 a group definition from one or more members of the proposed group. This can be accomplished, for example, by the member(s) providing a unique identifier of each proposed member, e.g., a name, alias, identification number, etc. through a website, mobile application, kiosk in the gaming venue, etc. A unique group identifier, e.g., a name, number, QR code, etc. can be generated 410 for the defined group and the group identifier can be provided 415 to each member of the group. For example, the unique group identifier can be sent to a mobile device for each member through an SMS message or mobile application executing on the mobile device of each member.

When the members of the group arrive at the gaming venue, each member can present the group identifier to check in or initiate the group activity. For example, each member can scan a provided QR code or enter a provided group identifier through a gaming system 115, kiosk, scanner, etc. within the gaming venue. This group identifier can then be received 420 by the surveillance system 105 of the gaming venue, along with an identifier for that member, and the member can be assigned 425 or checked into the group.

Figure 5:
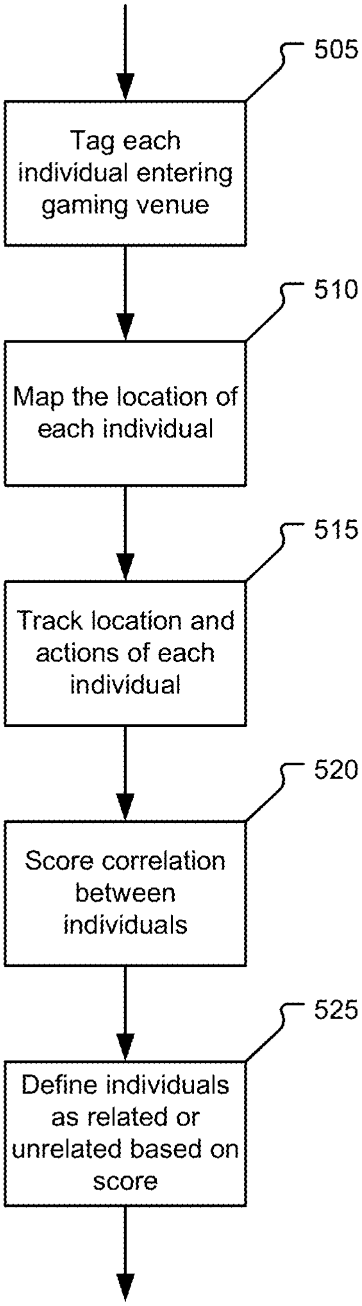
FIG. 5 is a flowchart illustrating an exemplary process for identifying related individuals within a gaming venue according to another embodiment of the present disclosure.

FIG. 5 is a flowchart illustrating an exemplary process for identifying related individuals within a gaming venue according to another embodiment of the present disclosure. More specifically, this example illustrates a process for defining groups automatically based on tracking of individuals' location and actions within the gaming venue. As illustrated in this example, the process can begin with tagging 505 each individual 125A-C when entering the gaming venue or otherwise performing some action such as carding into a gaming system 115. Tagging 505 each individual 125A-125C can comprise assigning a unique but anonymous identifier to each individual for the sake of monitoring. In other cases, one or more of the individuals 125A-C may be known to the surveillance system 105 and can be identified by an assigned username, number, alias, etc.

Once tagged 505, the location of each individual within the gaming venue can be mapped 510 on a virtual map of the gaming venue and that location, as well as actions performed by each individual can be tracked 515 as the individuals move about the gaming venue. The actions tracked can comprise, for example, gestures and/or motions, a direction of gaze, expressions or motions of the face such as movement of the mouth indicative of speaking, etc.

As each individual is tracked 515, their movements and/or actions may indicate some correlation. For example, two individuals 125A and 125B may enter the gaming venue at or near the same time. This can indicate some initial correlation. Additionally, or alternatively, these two individuals 125A and 125B may stand, sit, and/or walk near each other for some period of time indicating that they may be related. Based on definitions in the model, these movements can be scored. For example, the model may define that sitting or standing together for a certain period of time indicates a certain confidence level that these two individuals 125A and 125B are somehow related. Similarly, the model may indicate that walking together for a certain amount of time may indicate a confidence level that these two individuals 125A and 125B are related. This confidence level can increase or decrease as defined by the model as the individuals spend more or less time in proximity to each other. The location within the gaming venue and the proximity may also affect the confidence level based on the definitions in the model. For example, proximity within a predefined distance when in a restaurant or bar of the gaming venue or at a gaming table of the gaming venue may indicate a relatively high confidence level that these two individuals 125A and 125B are related.

In addition to location, actions may be tracked 515. For example, the surveillance system 105 can track card in activity to gaming systems 115 within the gaming venue. The model may indicate that carding into the same gaming system 115 or nearby gaming systems may indicate a predefined confidence level that these two individuals 125A and 125B are related. Other tracked activities, e.g., tracked through cameras 120A and 120B of the gaming venue, can include, but are not limited to, gestures and/or motions, a direction of gaze, expressions or motions of the face such as movement of the mouth indicative of speaking, etc. The model can define certain confidence levels that the two individuals 125A and 125B are related based on these actions. For example, shaking hands, hugging, speaking to one another, waving or gesturing in the direction of each other, looking at each other, etc. can be actions for which the model defines different confidence levels that these two individuals 125A and 125B are related.

As the individuals 125A-125C are tracked 515 while they move about the gaming venue and their movement and actions are scored 520, the confidence that two individuals 125A and 125B are related will increase or decrease. Individuals 125A-125C can then be defined 525 or identified as related or unrelated based on this confidence score and predefined thresholds in the model. For example, once the confidence score drops below a certain lower threshold defined in the model, two individuals 125B and 125C can be marked or tagged as unrelated. Similarly, once the confidence score exceeds a certain upper threshold defined in the model, two individuals 125A and 125B can be marked or tagged as related.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for monitoring individuals within a gaming venue, the method comprising:

receiving, by a surveillance system of the gaming venue, input from a plurality of input devices at different locations within the gaming venue;

identifying, by the surveillance system of the gaming venue, each of a plurality of individuals within the gaming venue based on the received input from the plurality of input devices;

scoring, by the surveillance system of the gaming venue, movements of each individual of the plurality of individuals within the gaming venue relative to each other using a model defining factors for identifying relationships between individuals based on movement of the individuals relative to each other;

identifying, by the surveillance system of the gaming venue, two related individuals of the plurality of individuals based on scoring the movements of each of the plurality of individuals within the gaming venue relative to each other; and initiating, by the surveillance system of the gaming venue, an action directed to the identified two related individuals.

2. The method of claim 1, wherein identifying an individual of the plurality of individuals within the gaming venue is based on the individual accessing a gaming system of the gaming venue.

3. The method of claim 1, wherein identifying an individual of the plurality of individuals within the gaming venue is based on a unique identifier for the individual received from one of the plurality of input devices.

4. The method of claim 3, wherein identifying the two related individuals of the plurality of individuals is further based on a group identifier received from one of the plurality of input devices.

5. The method of claim 4, further comprising training, by the surveillance system of the gaming venue, the model based on identifying the two related individuals of the plurality of individuals within the gaming venue.

6. The method of claim 1, further comprising tracking, by the surveillance system of the gaming venue, each of the plurality of individuals within the gaming venue based on the received input from the plurality of input devices and wherein identifying the two related individuals is further based on the tracking of each of the plurality of individuals within the gaming venue.

7. The method of claim 6, wherein tracking each of the plurality of individuals within the gaming venue comprises tracking gestures of each individual of the plurality of individuals and wherein identifying the two related individuals of the plurality of individuals in the gaming venue is further based on gestures exchanged between the two related individuals.

8. A system comprising:
a plurality of input devices at different locations within a gaming venue;
a processor communicatively coupled with each of the plurality of input devices and
a memory coupled with and readable by the processor and storing therein a set of instructions which, when executed by the processor, causes the processor to:
receive input from the plurality of input devices;
identify each of a plurality of individuals within the gaming venue based on the received input from the plurality of input devices;
score movements of each individual of the plurality of individuals within the gaming venue relative to each other using a model defining factors for identifying relationships between individuals based on movements of the individuals relative to each other;
identify two related individuals of the plurality of individuals based on scoring the movements of each of the plurality of individuals within the gaming venue relative to each other; and
initiate an action directed to the identified two related individuals.

9. The system of claim 8, wherein the instructions further cause the processor to track each of the plurality of individuals within the gaming venue based on the received input from the plurality of input devices and wherein identifying the two related individuals is further based on the tracking each of the plurality of individuals within the gaming venue.

10. The system of claim 9, wherein an input device of the plurality of input devices comprises a camera.

11. The system of claim 10, wherein tracking each of the plurality of individuals within the gaming venue comprises tracking movement and actions by each of the plurality of individuals based on the received input from the camera.

12. The system of claim 9, wherein an input device of the plurality of input devices comprises an input device of a gaming system of the gaming venue.

13. The system of claim 12, wherein tracking each of the plurality of individuals within the gaming venue comprises tracking a location and actions by each of the plurality of individuals within the gaming venue based on the received input from the input device of the gaming system.

14. The system of claim 9, wherein tracking each of the plurality of individuals within the gaming venue comprises tracking actions by each of the plurality of individuals and wherein identifying the two related individuals of the plurality of individuals is further based on correlating the actions by the two related individuals.

15. A non-transitory, computer-readable medium comprising a set of instructions stored therein which, when executed by a processor, causes the processor to:
receive input from a plurality of input devices;
identify each of a plurality of individuals within a gaming venue based on the received input from the plurality of input devices;
score movements of each individual of the plurality of individuals within the gaming venue relative to each other using a model defining factors for identifying relationships between individuals based on movements of the individuals relative to each other;
identify two related individuals of the plurality of individuals based on scoring the movements of each of the plurality of individuals within the gaming venue relative to each other; and
initiate an action directed to the identified two related individuals.

16. The non-transitory, computer-readable medium of claim 15, wherein the instructions further cause the processor to track each of the plurality of individuals within the gaming venue based on the received input from the plurality of input devices and wherein identifying the two related individuals is further based on the tracking each of the plurality of individuals within the gaming venue.

17. The non-transitory, computer-readable medium of claim 15, wherein initiating an action directed to the identified two related individuals comprises providing an electronic message to a mobile device of each of the identified two related individuals and receiving from the mobile device of each of the identified two related individuals a response confirming or denying a relationship between the identified two related individuals.

18. The non-transitory, computer-readable medium of claim 17, wherein the instructions further cause the processor to train the model based on the response received from the mobile device of each of the identified two related individuals confirming or denying the relationship between the identified two related individuals.

19. The non-transitory, computer-readable medium of claim 15, wherein initiating an action directed to the identified two related individuals comprises enabling a feature of a gaming system of the gaming venue for the two related individuals.

20. The non-transitory, computer-readable medium of claim 15, wherein initiating an action directed to the identified two related individuals comprises providing to a mobile device of each of the two related individuals an electronic message indicating availability of a benefit provided by the gaming venue.

* * * * *